(12) United States Patent
Yoo et al.

(10) Patent No.: US 9,891,775 B2
(45) Date of Patent: *Feb. 13, 2018

(54) TOUCH-SENSITIVE DISPLAY DEVICE WITH METAL ELECTRODES IN A MESH PATTERN

(71) Applicant: LG Display Co., Ltd., Seoul (KR)

(72) Inventors: Sejong Yoo, Paju-si (KR); NackBong Choi, Goyang-si (KR); YongChul Kim, Paju-si (KR); Jonghyun Han, Paju-si (KR); Haeyeon Jeong, Osan-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/492,942

(22) Filed: Apr. 20, 2017

(65) Prior Publication Data

US 2017/0220157 A1 Aug. 3, 2017

Related U.S. Application Data

(63) Continuation of application No. 14/586,813, filed on Dec. 30, 2014.

(30) Foreign Application Priority Data

Mar. 13, 2014 (KR) .......................... 10-2014-0029901
Jun. 27, 2014 (KR) .......................... 10-2014-0080094

(51) Int. Cl.
*G06F 3/041* (2006.01)
*G06F 3/044* (2006.01)
(Continued)

(52) U.S. Cl.
CPC ............ *G06F 3/044* (2013.01); *G06F 3/0412* (2013.01); *G06F 1/16* (2013.01); *G06F 1/1652* (2013.01);
(Continued)

(58) Field of Classification Search
CPC ........ G06F 3/044; G06F 3/047; G06F 3/0412; G06F 2203/04103; G06F 2203/04112;
(Continued)

(56) References Cited

U.S. PATENT DOCUMENTS 8,586,874 B2  11/2013  Kuriki
8,593,413 B2  11/2013  Chuang
(Continued)

FOREIGN PATENT DOCUMENTS

CN  102646006  8/2012
CN  102725714  10/2012
WO  WO 2011/025213  3/2011

OTHER PUBLICATIONS

Office Action for U.S. Appl. No. 14/586,813, dated Aug. 17, 2016, 20 Pages.
(Continued)

*Primary Examiner* — Michael J Jansen, II
(74) *Attorney, Agent, or Firm* — Fenwick & West LLP

(57) ABSTRACT

Disclosed herein is a touch-sensitive display device comprising: a first set of metal electrodes including a first metal electrode; a second set of metal electrodes including a second metal electrode and a third metal electrode, the first metal electrode located between the second metal electrode and the third metal electrode such that the second metal electrode is physically separated from the third metal electrode; a first set of touch electrodes including a first touch electrode that is connected to the first metal electrode; a second set of touch electrodes including a second touch electrode and a third touch electrode, the second touch electrode connected to the second metal electrode and the third touch electrode connected to the third metal electrode; an insulation film having a plurality of contact holes; and a connection electrode electrically connecting the second
(Continued)

metal electrode to the third metal electrode through the plurality of contact holes.

16 Claims, 11 Drawing Sheets

(51) Int. Cl.
    *G06F 3/047*     (2006.01)
    *G06F 1/16*     (2006.01)

(52) U.S. Cl.
    CPC .... *G06F 3/047* (2013.01); *G06F 2203/04102* (2013.01); *G06F 2203/04111* (2013.01); *G06F 2203/04112* (2013.01)

(58) Field of Classification Search
    CPC . G06F 2203/04111; G06F 2203/04102; G06F 1/16; G06F 1/1652; G02F 1/13338; G02F 1/13439; G02F 1/155; G02F 1/133305; G02F 1/134336; G09G 2300/0426
    See application file for complete search history.

(56) References Cited

U.S. PATENT DOCUMENTS

| | | | |
|---|---|---|---|
| 8,686,308 B2 | 4/2014 | Kuriki | |
| 8,709,265 B2* | 4/2014 | Misaki | G02F 1/1333 216/20 |
| 8,717,332 B2 | 5/2014 | Kono et al. | |
| 8,723,046 B2 | 5/2014 | Hashimoto et al. | |
| 8,747,959 B2* | 6/2014 | Krasnov | H01L 31/1884 427/255.19 |
| 8,766,105 B2 | 7/2014 | Kuriki | |
| 8,847,093 B2* | 9/2014 | Xie | G06F 3/044 200/600 |
| 9,030,438 B2* | 5/2015 | Cok | G06F 3/044 345/174 |
| 9,041,869 B2 | 5/2015 | Kim et al. | |
| 9,075,484 B2* | 7/2015 | Ritter | G06F 3/044 |
| 9,117,778 B2 | 8/2015 | Yanagawa et al. | |
| 9,202,949 B2 | 12/2015 | Kim et al. | |
| 9,207,720 B2 | 12/2015 | Kang et al. | |
| 9,262,018 B2* | 2/2016 | Kim | G06F 3/044 |
| 9,285,842 B2* | 3/2016 | Yashiro | G06F 3/044 |
| 9,292,143 B2 | 3/2016 | Sugita et al. | |
| 9,405,330 B2 | 8/2016 | Yamagishi et al. | |
| 9,429,785 B2* | 8/2016 | Chae | G02F 1/13338 |
| 2010/0149116 A1* | 6/2010 | Yang | G06F 3/0416 345/173 |
| 2011/0012845 A1* | 1/2011 | Rothkopf | G06F 3/044 345/173 |
| 2011/0102370 A1 | 5/2011 | Kono et al. | |
| 2011/0210935 A1 | 9/2011 | Chuang | |
| 2011/0290631 A1 | 12/2011 | Kuriki | |
| 2012/0118614 A1 | 5/2012 | Kuriki | |
| 2012/0212449 A1 | 8/2012 | Kuriki | |
| 2012/0241408 A1* | 9/2012 | Misaki | G02F 1/1333 216/20 |
| 2012/0249478 A1 | 10/2012 | Chang et al. | |
| 2012/0262385 A1* | 10/2012 | Kim | G06F 3/044 345/173 |
| 2013/0000954 A1 | 1/2013 | Hashimoto et al. | |
| 2013/0005139 A1* | 1/2013 | Krasnov | G02F 1/13439 438/652 |
| 2013/0044384 A1* | 2/2013 | Kim | B05D 5/06 359/885 |
| 2013/0063371 A1 | 3/2013 | Lee et al. | |
| 2013/0098749 A1* | 4/2013 | Xie | G06F 3/044 200/600 |
| 2013/0256105 A1* | 10/2013 | Lim | H03K 17/96 200/275 |
| 2013/0258568 A1* | 10/2013 | Iwata | H01B 1/22 361/679.01 |
| 2013/0341651 A1 | 12/2013 | Kim et al. | |
| 2014/0070350 A1 | 3/2014 | Kim et al. | |
| 2014/0139761 A1 | 5/2014 | Yanagawa et al. | |
| 2014/0152910 A1 | 6/2014 | Kang et al. | |
| 2014/0152917 A1* | 6/2014 | Lee | G06F 3/044 349/12 |
| 2014/0160377 A1 | 6/2014 | Yamagishi et al. | |
| 2014/0182894 A1 | 7/2014 | Liu et al. | |
| 2014/0198268 A1 | 7/2014 | Sugita et al. | |
| 2014/0346027 A1 | 11/2014 | Li et al. | |
| 2015/0049260 A1 | 2/2015 | Yashiro et al. | |
| 2015/0177884 A1* | 6/2015 | Han | G06F 3/044 345/174 |
| 2015/0185917 A1* | 7/2015 | Song | G06F 3/044 345/174 |
| 2015/0261370 A1* | 9/2015 | Yoo | G06F 3/0412 345/173 |
| 2016/0070406 A1* | 3/2016 | Han | G06F 3/044 345/173 |
| 2016/0103516 A1* | 4/2016 | An | H01L 51/5256 345/174 |
| 2016/0216544 A1* | 7/2016 | Chae | G02F 1/13338 |

OTHER PUBLICATIONS

Office Action for Chinese Patent Application No. CN 201410858182.6, dated May 27, 2017, 7 Pages, (With English Translation).

* cited by examiner

TOUCH-SENSITIVE DISPLAY DEVICE WITH METAL ELECTRODES IN A MESH PATTERN

CROSS-REFERENCE TO RELATED APPLICATIONS

This application is a continuation of U.S. patent application Ser. No. 14/586,813 filed on Dec. 30, 2014 which claims the priority of Korean Patent Application No. 10-2014-0029901 filed on Mar. 13, 2014 and Korean Patent Application No. 10-2014-0080094 filed on Jun. 27, 2014, in the Korean Intellectual Property Office, the disclosures of which are incorporated herein by reference in their entirety.

BACKGROUND

Field of Technology

The present disclosure relates to a touch-sensitive display device, and more particularly to a touch-sensitive display device capable of minimizing cracks in touch electrodes possibly occurring in a flexible display and oxidation of wire electrodes, and of reducing power consumption for touch functionality.

Description of the Related Art

A touch-sensitive display device senses a user's touch made on one or more points on its display screen and also senses an operation associated with the user's touch. Such a touch-sensitive display device is widely utilized in personal handheld devices such as smart phones and tablet PCs, as well as in large display devices such as display devices placed in public facilities and smart TVs.

A touch-sensitive display device can be sorted by its operation manner into: a resistive type, a capacitive type, an IR (infrared ray) type, etc. Recently, a capacitive touch-sensitive display device is commonly used.

Typically, a capacitive touch-sensitive display device includes a plurality of first electrodes extending in a first direction and a plurality of second electrodes extending in a second direction. The electrodes are made of a transparent and electrically-conductive material such as ITO (indium tin oxide) and IZO (indium zinc oxide). In a capacitive touch-sensitive display device, when a user makes a physical contact on the display device, capacitance of the first electrodes and the second electrodes around the contact position is changed and the contact position is detected based on the change in capacitance.

Recently, a touch-sensitive display device is being developed as a flexible display which has become thinner and bendable. Accordingly, research is on-going for such a flexible display to reduce cracks in touch electrodes or the like.

Transparent and electrically-conductive materials used for touch electrodes, such as ITO (indium tin oxide), are not appropriate to be implemented in a flexible display because they are less flexible than typical metal materials. In addition, transparent and electrically-conductive materials have higher surface resistance than that of metal materials, and thus resistance between electrodes becomes is increased in the process of manufacturing a touch-sensitive display device for high precision and a large screen. Consequently, detection sensitivity of a touch location becomes lower.

SUMMARY

ITO, one of the transparent electrically-conductive materials used for touch electrodes of a touch-sensitive display device, has higher resistance and lower flexibility than those of metal materials. Therefore, if a touch-sensitive display device that uses ITO as the material for its touch electrodes is applied to a flexible display, cracks may occur in the ITO. This may result in defects in the flexible display. In addition, due to ITO's higher resistance than that of metal materials, power consumption increases as a touch-sensitive display device becomes larger. Also, touch sensitivity is significantly decreased in the center portion of the display device which in return causes a slower response speed.

Under the circumstances, an object of the present disclosure is to provide a touch-sensitive display device with reduced power consumption for sensing touch and will also be applicable to a large touch-sensitive display device.

Another object of the present disclosure is to provide a touch-sensitive display device capable of minimizing cracks in touch electrodes when the display device is bent.

Objects of the present disclosure are not limited to those described above and other objects will be clearly understood by those skilled in the art from the following descriptions.

According to an aspect of the present disclosure, there is provided a touch-sensitive display device, comprising: a black matrix disposed on a substrate, the black matrix defining a plurality of pixels; a first set of metal electrodes patterned on the black matrix, the first set of metal electrodes including a first metal electrode having a first mesh pattern; a second set of metal electrodes patterned on the black matrix, the second set of metal electrodes including a second metal electrode having a second mesh pattern and a third metal electrode having a third mesh pattern, the first metal electrode located between the second metal electrode and the third metal electrode such that the second metal electrode is physically separated from the third metal electrode; an insulation film formed over the first set of metal electrodes and the second set of metal electrodes including the first metal electrode, the second metal electrode, and the third metal electrode, the insulation film having a plurality of contact holes; and a connection electrode electrically connecting the second metal electrode to the third metal electrode through the plurality of contact holes.

In some embodiments, the first mesh pattern, the second mesh pattern, and the third mesh pattern are distinct from one another.

In some embodiments, the first mesh pattern, the second mesh pattern, and the third mesh pattern are substantially the same.

In some embodiments, the first mesh pattern, the second mesh pattern, and the third mesh pattern each includes a plurality of electrode lines that intersect with one another to create the corresponding mesh pattern.

In some embodiments, the touch-sensitive display device may further comprise a barrier layer disposed between the substrate and the black matrix. The barrier layer may comprises at least one of an organic layer or an inorganic layer.

In some embodiments, the first set of metal electrodes may extend in a first direction, and the second set of metal electrodes may extend in a second direction.

In some embodiments, the touch-sensitive display device may further comprise a color filter disposed between the substrate and the black matrix.

In some embodiments, the first touch electrode includes a first plurality of segments that are connected to the first metal electrode, and wherein the second touch electrode includes a second plurality of segments that are connected to the second metal electrode, and wherein the third touch electrode includes a third plurality of segments that are connected to the third metal electrode.

In some embodiments, a size of each of the first plurality of segments of the first touch electrode, a size of the second plurality of segments of the second touch electrode, and a size of the third plurality of segments of the third touch electrode are an integer multiple greater in size than a size of the pixels.

In some embodiments, each of the pixels may comprise a plurality of sub-pixels, and a size of each of the first plurality of segments of the first touch electrode, a size the second plurality of segments of the second touch electrode, and a size the third plurality of segments of the third touch electrode are an integer multiple greater than that of a size of the sub-pixels.

In some embodiments, at least one of the first plurality of segments of the first touch electrode overlaps at least one intersection of the plurality of electrode lines of the first mesh pattern, and wherein at least one of the second plurality of segments of the second touch electrode overlaps at least one intersection of the plurality of electrode lines of the second mesh pattern, and wherein at least one of the third plurality of segments of the third touch electrode overlaps at least one intersection of the plurality of electrode lines of the third mesh pattern.

In some embodiments, the connection electrodes may be disposed so that they are aligned with the black matrix.

According to another aspect of the present disclosure, there is provided a touch-sensitive display device with a color filter and a black matrix disposed on a substrate. The touch-sensitive display device comprising: a plurality of first metal electrodes disposed on the black matrix in a first direction; a plurality of second metal electrodes disposed on the black matrix in a second direction; an insulation film disposed over the plurality of first metal electrodes and the plurality of second metal electrodes, the insulation film having a plurality of contact holes in the insulation film; a plurality of first touch electrodes disposed on the insulation film, each of the plurality of first touch electrodes connected to a corresponding one of the plurality of first metal electrodes through one of the plurality of contact holes; a plurality of second touch electrodes disposed on the insulation film, each of the plurality of second touch electrodes connected to a corresponding one of the plurality of second metal electrodes through one of the plurality of contact holes, the plurality of second touch electrodes including a pair of second touch electrodes physically separated from one another; and a connection electrode disposed on the insulation film, the connection electrode electrically connecting together the pair of second touch electrodes.

In some embodiments, wherein one of the plurality of first metal electrodes is located between the pair of second touch electrodes and the one of the plurality of first metal electrodes physically separate the pair of second touch electrodes from each other.

In some embodiments, the connection electrode comprises expanded portions of the pair of second touch electrodes.

In some embodiments, apart of the connection electrode is located above a part of the one of the plurality of first metal electrodes located between the pair of second touch electrodes.

According to the present disclosure, there is provided a touch-sensitive display device, comprising: a flexible substrate comprising a plurality of pixels defined by a black matrix; a plurality of metal electrodes disposed on the black matrix, each of the plurality of metal electrodes including electrode lines that intersect one another; and a plurality of transparent touch electrodes disposed on the plurality of metal electrodes, each transparent touch electrode including a plurality of segments defined by an intersection of a plurality of the electrode lines, wherein each segment has a size equal to an integer multiple greater than that of a size of the pixels to distribute stress exerted on the transparent touch electrodes over the plurality of segments.

In some embodiments the intersection of the plurality of the electrode lines is located at a center of a corresponding transparent electrode.

In some embodiments, the touch-sensitive display device may further comprise: an insulation film formed over the plurality of metal electrodes.

In some embodiments, the plurality of metal electrodes extend to a pad unit that transmits a touch sensing signal.

In some embodiments, the touch-sensitive display device may further comprise: an anti-oxidation layer disposed on the pad unit, the anti-oxidation layer covering the plurality of extended metal electrodes to reduce oxidation of the metal electrodes, wherein the anti-oxidation layer is made of a same material as the plurality of transparent touch electrodes.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
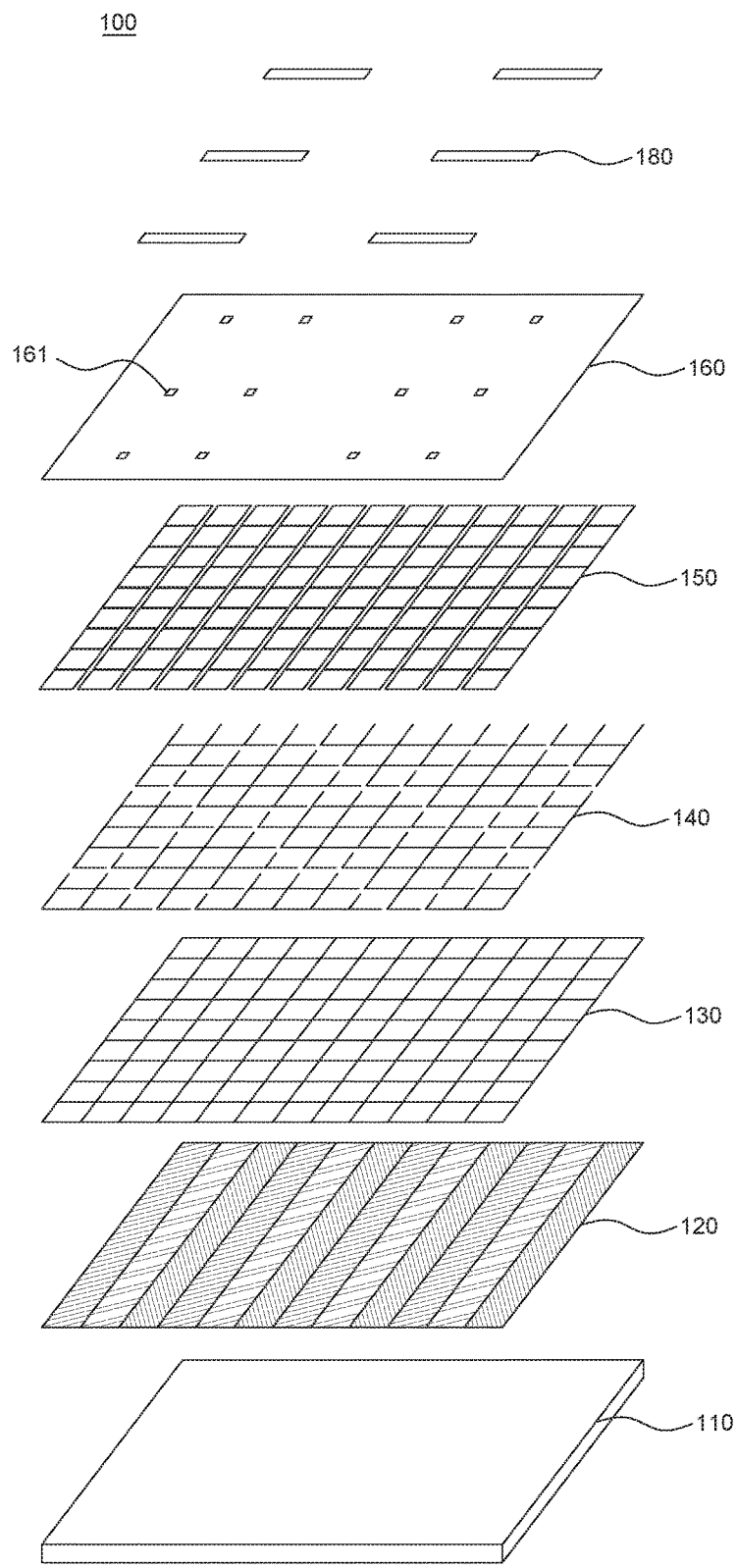
FIG. 1 is a schematic and exploded perspective view of a touch-sensitive display device according to an exemplary embodiment of the present disclosure.

Advantages and features of the present disclosure and methods to achieve them will become apparent from the descriptions of exemplary embodiments herein below with reference to the accompanying drawings. However, the present disclosure is not limited to exemplary embodiments disclosed herein but may be implemented in various different ways. The exemplary embodiments are provided for making the disclosure thorough and for fully conveying the scope of the present invention to those skilled in the art. It is to be noted that the scope of the present invention is defined only by the claims.

The figures, dimensions, ratios, angles, numbers of elements given in the drawings are merely illustrative and are not limiting. Like reference numerals denote like elements throughout the descriptions. Further, in describing the present invention, descriptions on well-known technologies may be omitted in order not to obscure the gist of the present invention. It is to be noticed that the term "comprising", "having", including" and so on, used in the present description and claims, should not be interpreted as being restricted to the means listed thereafter unless specifically stated otherwise. Where an indefinite or definite article is used when referring to a singular noun, e.g. "a", "an", "the", this includes a plural of that noun unless specifically stated otherwise.

The drawings are not to scale and the relative dimensions of various elements in the drawings are depicted schematically and not necessarily to scale.

Features of various exemplary embodiments of the present invention may be combined partially or totally. As will be clearly appreciated by those skilled in the art, technically various interactions and operations are possible. Various exemplary embodiments can be practiced individually or in combination.

Hereinafter, exemplary embodiments of the present invention will be described in detail with reference to the accompanying drawings.

Figure 2A:
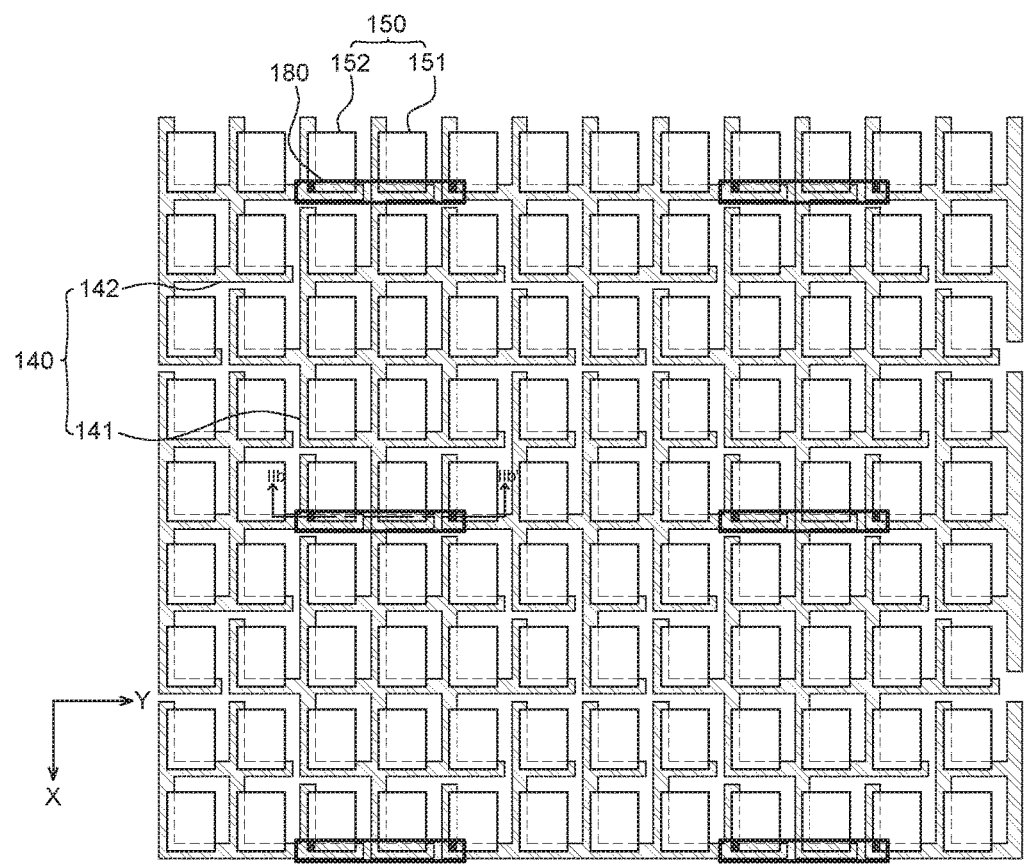
FIG. 2A is a schematic plan view of a part of a touch-sensitive display device according to an exemplary embodiment of the present disclosure.
Figure 2B:
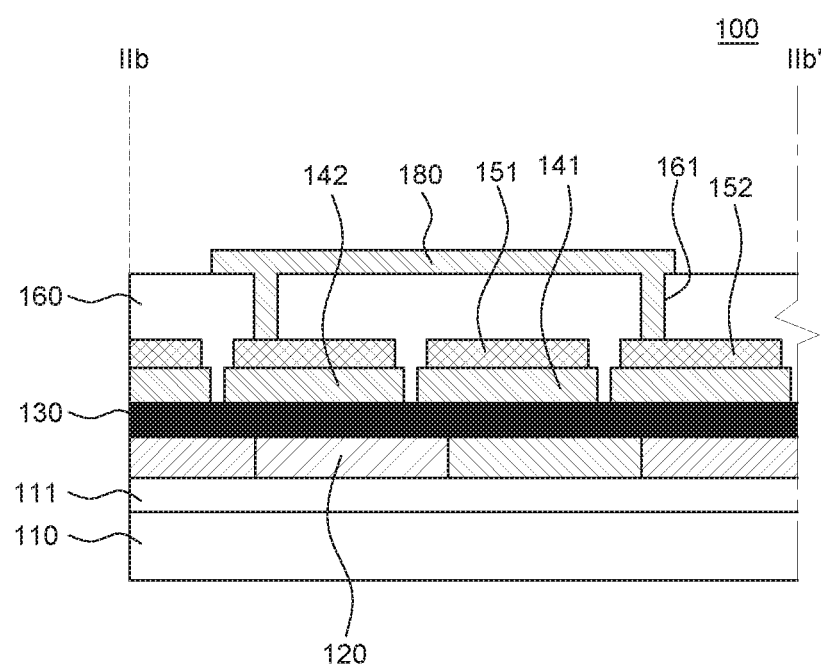
FIG. 2B is a schematic cross-sectional view of the touch-sensitive display device shown in FIG. 2A, taken along the line IIb-IIb' according to an exemplary embodiment of the present disclosure.

FIG. 1 is a schematic and exploded perspective view of a touch-sensitive display device according to an exemplary embodiment. FIG. 2A is a schematic plan view of a part of a touch-sensitive display device according to an exemplary embodiment. FIG. 2B is a schematic cross-sectional view of the touch-sensitive display device shown in FIG. 2A, taken along line IIb-IIb' according to an exemplary embodiment.

Referring to FIG. 1, a touch-sensitive display device 100 includes a substrate 110, a color filter 120, a black matrix 130, metal electrodes 140, touch electrodes 150, an insulation film 160, and connection electrodes 180.

In FIG. 1, the thickness and width of the black matrix 130, first touch electrodes 151, second touch electrodes 152 and the connection electrodes 180 are not depicted for the sake of simplicity of illustration. The thickness and width of the black matrix 130, the first touch electrodes 151, the second touch electrodes 152 and the connection electrodes 180 may vary depending on design choices.

The color filter 120, which is included in the touch-sensitive display device 100 shown in FIG. 1, is not an essential element but is an optional one that may be employed depending on the type of light-emitting elements of the touch-sensitive display device 100.

Referring to FIG. 1, the touch-sensitive display device 100 including the color filter 120 will be described. Referring to FIGS. 1 and 2B, a barrier layer 111 is disposed on the substrate 110. The barrier layer 111 is formed on the substrate 110 for preventing moisture and oxygen from permeating into the substrate 110 and it may be formed as a plurality of layers composed of inorganic layers such as silicon nitride ($SiN_x$) or organic layers.

The color filter 120 is formed on the barrier layer 111. The black matrix 130 is formed on the color filter 120 in a mesh pattern so that pixels of the touch-sensitive display device 100 are defined.

The metal electrodes 140 are formed on the black matrix 130 in a mesh pattern and may be patterned so as to form a plurality of electrodes.

Various patterns of the metal electrodes 140 will be described later on.

To reduce electrical resistance of the metal electrodes 140, the metal electrodes 140 may be made of a metal material having low resistance such as copper (Cu) and silver (Ag). In this regard, since metal materials have high reflectivity for light incident thereon, the metal electrodes 140 are located on the backside of the black matrix 130 when viewed by a viewer, in order that the light incident thereon neither deteriorates the visibility nor adversely affects the aperture ratio of the touch-sensitive display device 100.

The touch electrodes 150 are formed on the metal electrodes 140.

The size of each of the touch electrodes 150 is an integer greater than that of sub-pixels or pixels defined by the black matrix 130.

The insulation film 160 having a plurality of apertures 161 (e.g. holes) therein is formed on the touch electrodes 150, and the connection electrodes 180 are formed on the insulation film 160 so that the metal electrodes 140 and the connection electrodes 180 are connected to one another via the plurality of apertures 161 (e.g., holes) in the insulation film 160.

The touch electrodes 150 are made of a transparent and electrically-conductive material. For example, the touch electrodes 150 may be made of a transparent and electrically-conductive oxide, such as ITO (indium tin oxide) and IZO (indium zinc oxide).

Referring to FIGS. 2A and 2B, the metal electrodes 140 include the first metal electrodes 141 and the second metal electrodes 142.

The first metal electrodes 141 are formed as a plurality of electrode lines intersecting with one another in a mesh pattern. The first metal electrodes 141 extend in a first direction (e.g., x-axis direction).

The second metal electrodes 142 are formed as a plurality of electrode lines intersecting with one another in a mesh pattern. In one embodiment, the second metal electrodes 142 each have a different mesh pattern. Alternatively, the second metal electrodes 142 have the same mesh pattern. Furthermore, the mesh pattern of the second metal electrodes 142 may be different from the mesh pattern of the first metal electrodes 141. Alternatively, the mesh pattern of the second metal electrodes 142 is the same as the mesh pattern of the first metal electrodes 141. The second metal electrodes 142, however, are disconnected from one another at intersections with the first metal electrodes 141 and are connected to one another through the connection electrodes 180. That is, second metal electrodes including a pair of second metal electrodes 142 (e.g., a second metal electrode and a third metal electrode) are physically separated from one another due to a first metal electrode 141 (e.g., a first metal electrode) being located between the pair of second metal electrodes 142. The second metal electrodes 142 extend in a second direction (e.g., Y-axis direction).

The touch electrodes 150 include first touch electrodes 151 and second touch electrodes 152. The first touch electrodes 151 are connected to the first metal electrodes 141 and the second touch electrodes 152 are connected to the second metal electrodes 142.

The touch electrodes 150 are connected to the metal electrodes 140 in such a manner that the first touch electrodes 151 and the second touch electrodes 152, which are segments of the touch electrodes 150, partially overlap the electrode lines of the metal electrodes 140 to connect them.

Figure 3A:
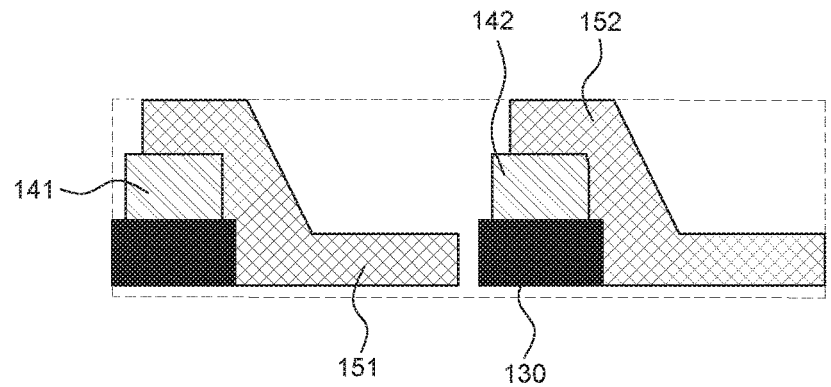
FIGS. 3A to 3C are schematic cross-sectional views of various connection schemes between a first touch electrode and a first metal electrode and between a second touch electrode and a second metal electrode according to exemplary embodiments of the present disclosure.
Figure 3B:
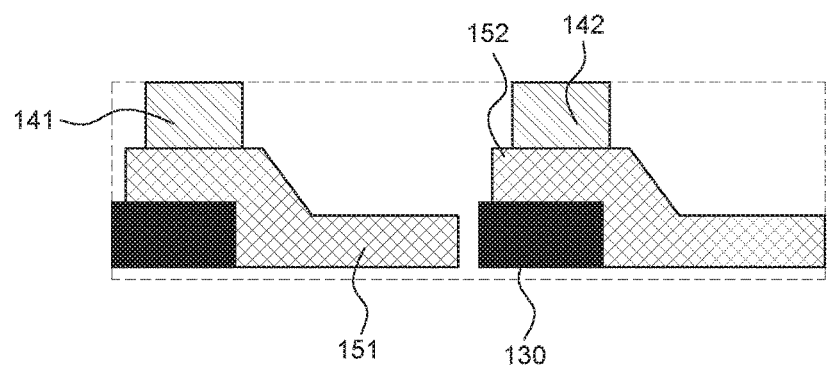
Figure 3C:
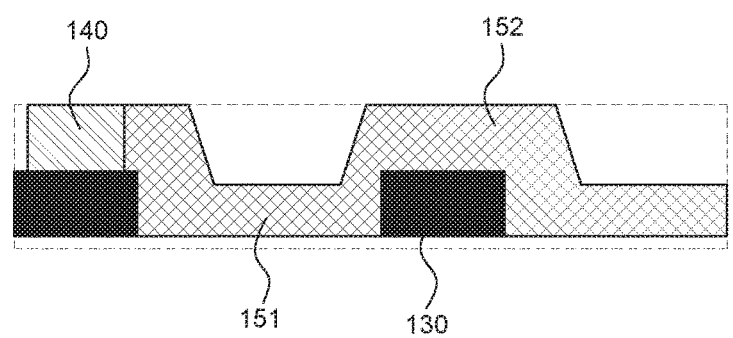

FIGS. 3A to 3C are schematic cross-sectional views of various connection schemes between a first touch electrode and a first metal electrode and between a second touch electrode and a second metal electrode according to exemplary embodiments of the present disclosure.

Referring to FIG. 3A, a first metal electrode 141 and a second metal electrode 142 are formed on the black matrix, and a first touch electrode 151 and a second touch electrode 152 are disposed on and connected to the first metal electrode 141 and the second metal electrode 142 respectively.

Referring to FIG. 3B, a first touch electrode 151 and a second touch electrode 152 partially overlap the black matrix. A first metal electrode 141 and a second metal electrode 142 are formed on the first touch electrode 151 and on the second touch electrode 152 above the black matrix 130 respectively.

FIG. 3C is a cross-sectional view showing another connection scheme between the touch electrodes 150 and the metal electrodes 140 according to an exemplary embodiment of the present disclosure. A metal electrode 140 is formed on the black matrix 130, and a side surface of the metal electrode 140 is in contact with a side surface of a touch electrode 150 on the black matrix.

Figure 4A:
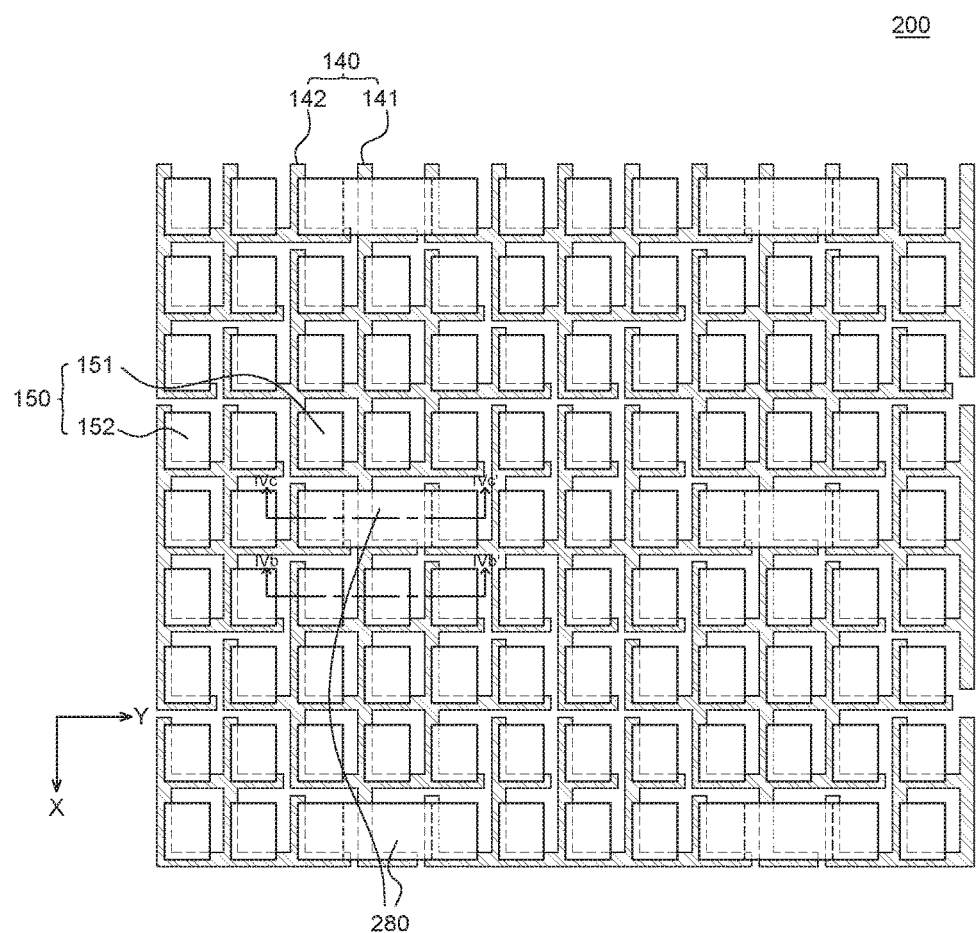
FIG. 4A is a schematic plan view of a part of a touch-sensitive display device according to another exemplary embodiment of the present disclosure.

FIG. 4A is a schematic plan view of a part of a touch-sensitive display device according to another exemplary embodiment of the present disclosure. The touch-sensitive display device 200 shown in FIG. 4A is identical to the touch-sensitive display device 100 shown in FIG. 2A except for the connection electrodes and the way in which touch electrodes 150 and metal electrodes 140 are connected to one another and therefore, redundant descriptions will not be made.

Referring to FIG. 4A, the second metal electrodes 142 are disconnected from one another at intersections with the first metal electrodes 141 and are connected to one another through the connection electrodes 280. The first metal electrodes 141 and the second metal electrodes 142 are formed in a mesh type. The connection electrodes 280 are formed by expanding the second touch electrodes 152 and are made of the same material as that of the first touch electrodes 151 and the second touch electrodes 152 in order to sense touch.

Figure 4B:
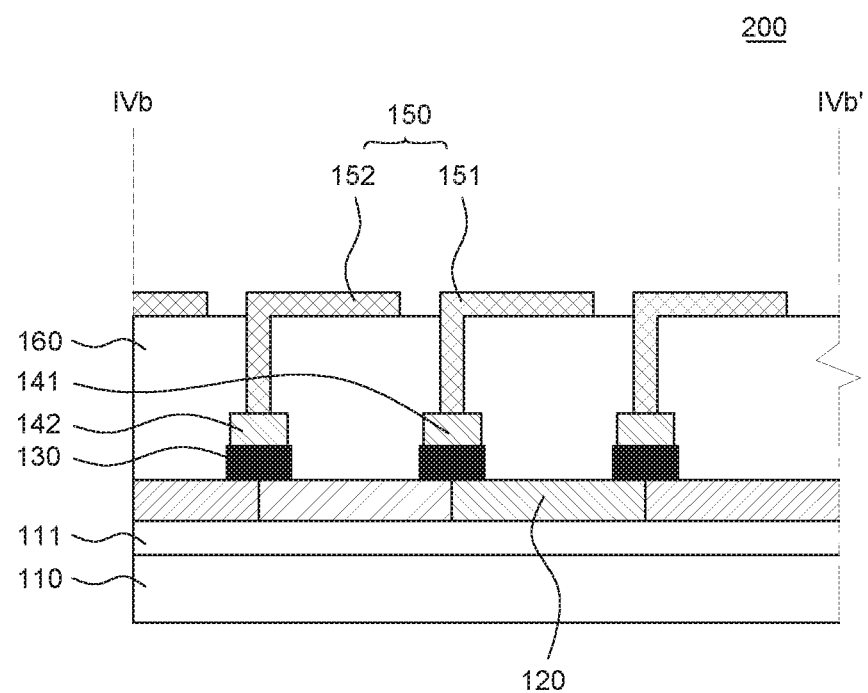
FIG. 4B is a schematic cross-sectional view of the touch-sensitive display device shown in FIG. 4A, taken along line IVb-IVb' according to an exemplary embodiment of the present disclosure.
Figure 4C:
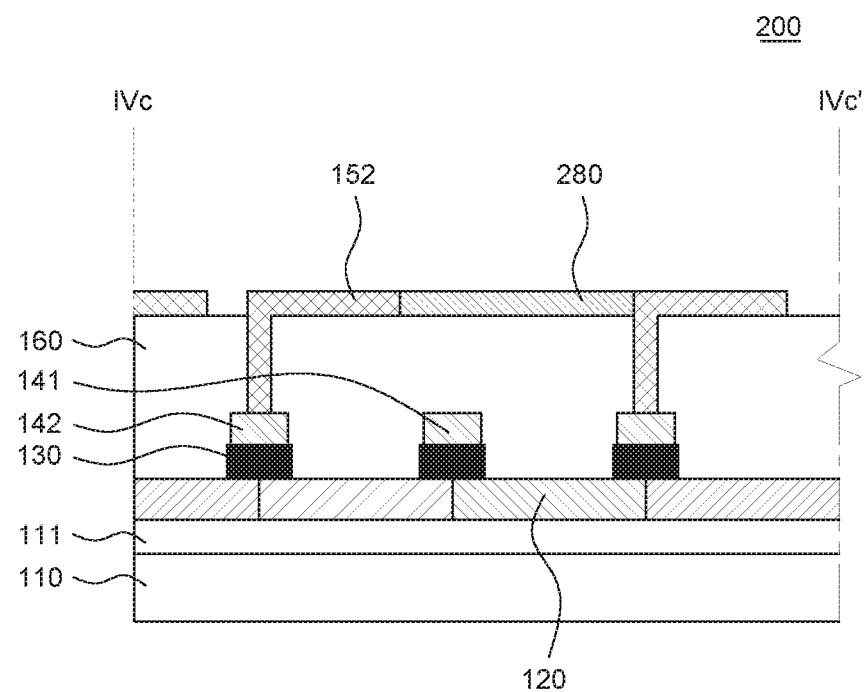
FIG. 4C is a schematic cross-sectional view of the touch-sensitive display device shown in FIG. 4A, taken along line IVc-IVc' according to an exemplary embodiment of the present disclosure.

FIG. 4B is a schematic cross-sectional view of the touch-sensitive display device shown in FIG. 4A, taken along the line IVb-IVb' according to an exemplary embodiment. FIG. 4C is a schematic cross-sectional view of the touch-sensitive display device shown in FIG. 4A, taken along the line IVc-IVc' according to an exemplary embodiment.

Referring to FIG. 4B, the black matrix 130 is formed on the color filter 120. On the black matrix 132, first metal electrodes 141 and second metal electrodes 142 are formed. An insulation film 160 having a plurality of contact holes 161 therein is formed over the color filter 120, the first metal electrodes 141 and the second metal electrodes 142.

Further, on the insulation film 160, first touch electrodes 151 and second touch electrodes 152 are formed. The first metal electrodes 141 and the second metal electrodes 142 are connected to the first touch electrodes 151 and the second touch electrodes 142, respectively, through the contact holes 161.

Referring to FIG. 4C, in order to connect second metal electrodes 142 which are disconnected from one another at intersections with a first metal electrode 141, a connection electrode 280 is formed by expanding a second touch electrode 152. The connection electrode 280 connects the second metal electrodes 142 that are disconnected from one another through the second touch electrode 152. Although the hatching of the connection electrode 280 is different from that of the second touch electrode 152 in FIG. 4C, the connection electrode 280 and the second touch electrode 152 may be made of the same material and may be formed integrally.

Figure 5A:
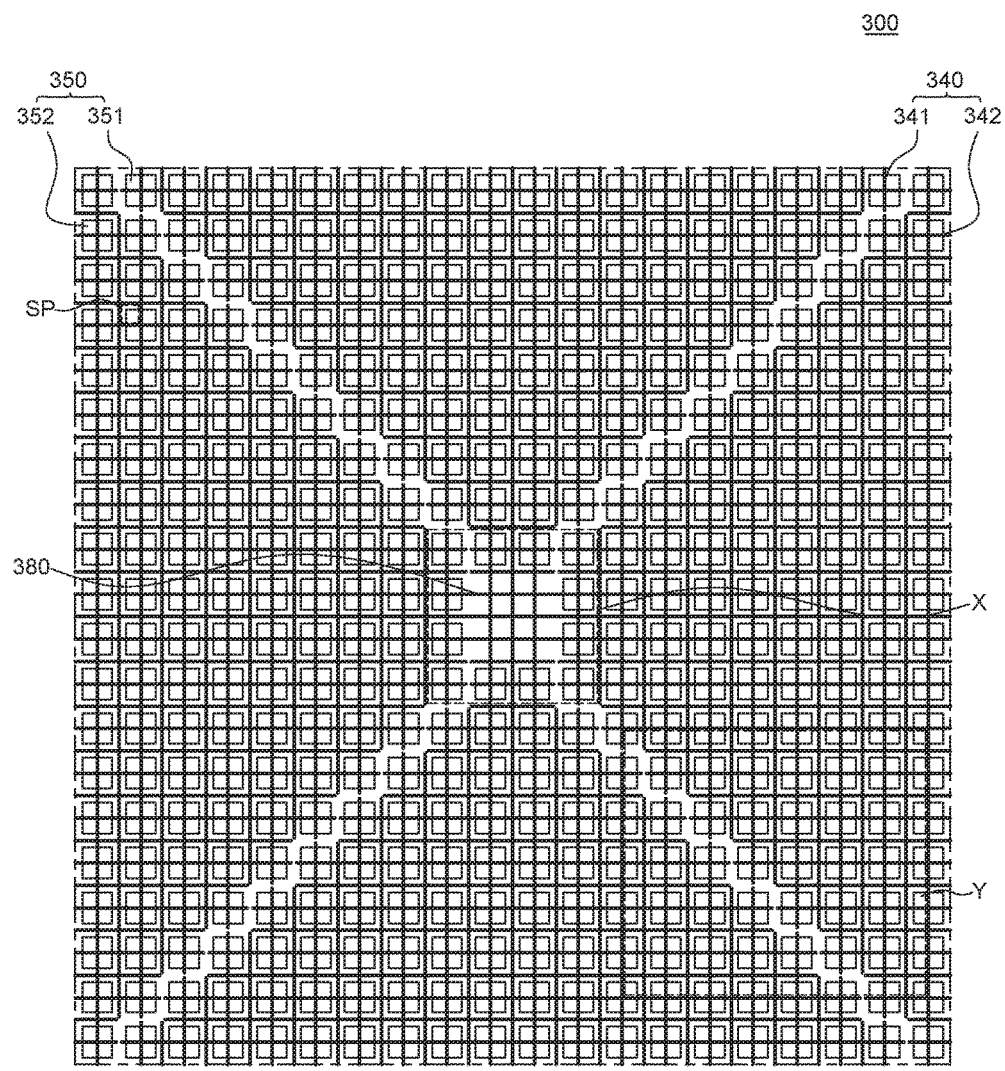
FIG. 5A is a schematic plan view of a touch-sensitive display device according to yet another exemplary embodiment of the present disclosure.

FIG. 5A is a schematic plan view of a touch-sensitive display device according to yet another exemplary embodiment of the present disclosure. The touch-sensitive display device 300 shown in FIG. 5A is identical to the touch-sensitive display device 100 shown in FIG. 2A except for the way in which touch electrodes 350 and metal electrodes 340 are connected to one another and therefore, redundant descriptions will not be made.

Figure 5B:
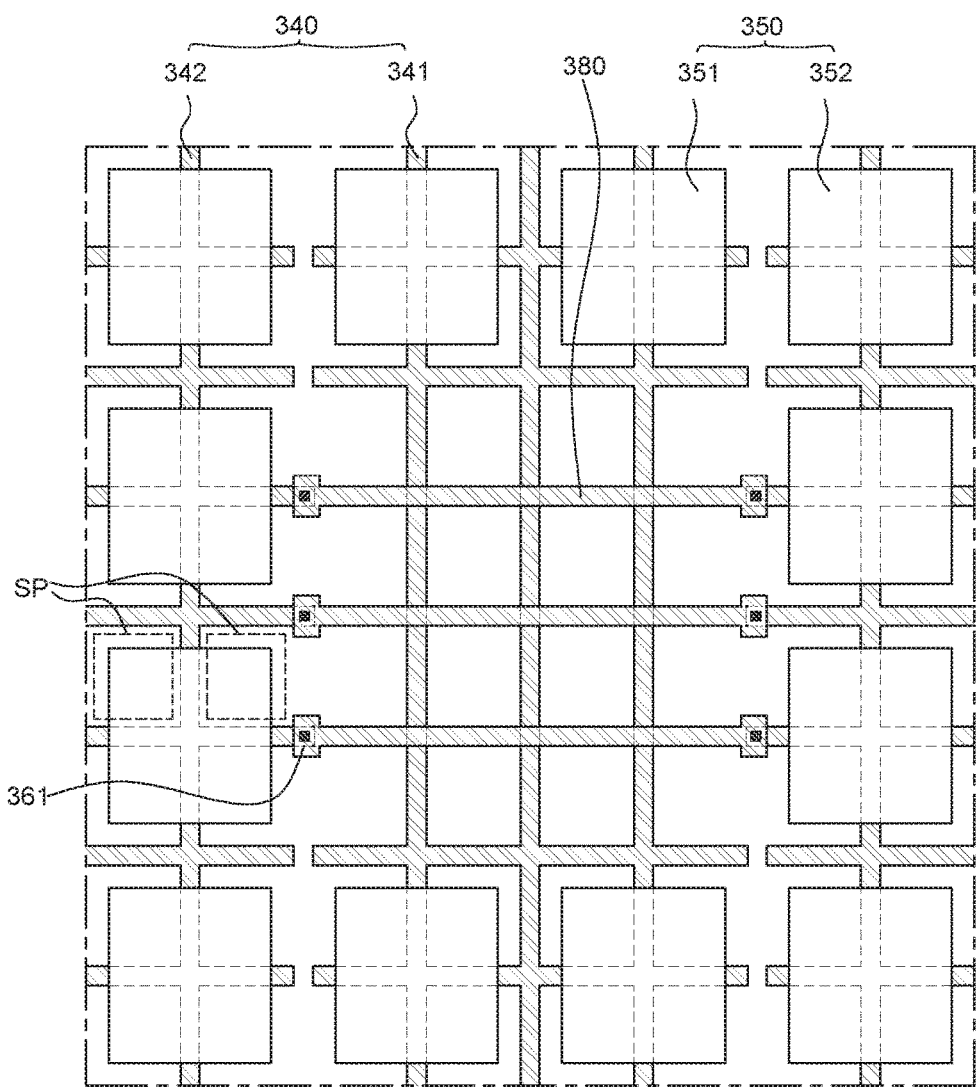
FIG. 5B is an enlarged plan view of region X shown in FIG. 5A according to an exemplary embodiment of the present disclosure.

Referring to FIG. 5A, each of segments of the touch electrodes 350 overlaps an intersection of electrode lines of the metal electrodes 340 and is connected to another segment. As shown in FIG. 5B, each of segments of the first touch electrode 351 and the second touch electrode 352 of the touch electrodes 350 overlaps an intersection between a first metal electrode 341 and a second metal electrode 342 of the metal electrodes 340, having its center on the intersection. By doing so, the total surface resistance of the touch electrodes 350 is reduced, while cracks occurring in the touch electrodes 350 in a flexible environment are minimized. In the example of FIG. 5A, one touch electrode 350 covers four sub-pixels (SPs). However, the size of a touch electrode 350 is not limited thereto. For example, one touch electrode 350 may cover one or more sub-pixels (SPs) or may cover a single pixel.

FIG. 5B is an enlarged plan view of region X shown in FIG. 5A.

Referring to FIG. 5B, the second metal electrodes 342 are separated from one another at intersections with the first metal electrodes 341 and are connected to one another through the connection electrodes 380. Although not shown in FIG. 5B, the insulation film 160 as shown in FIG. 2B may be formed on the first metal electrodes 341 so that the connection electrodes 380 may be insulated from the first metal electrodes 341.

As shown in FIG. 5B, one or more connection electrodes 380 may be formed, which may be made of aluminum (Al) or molybdenum (Mo) or the like.

Figure 5C:
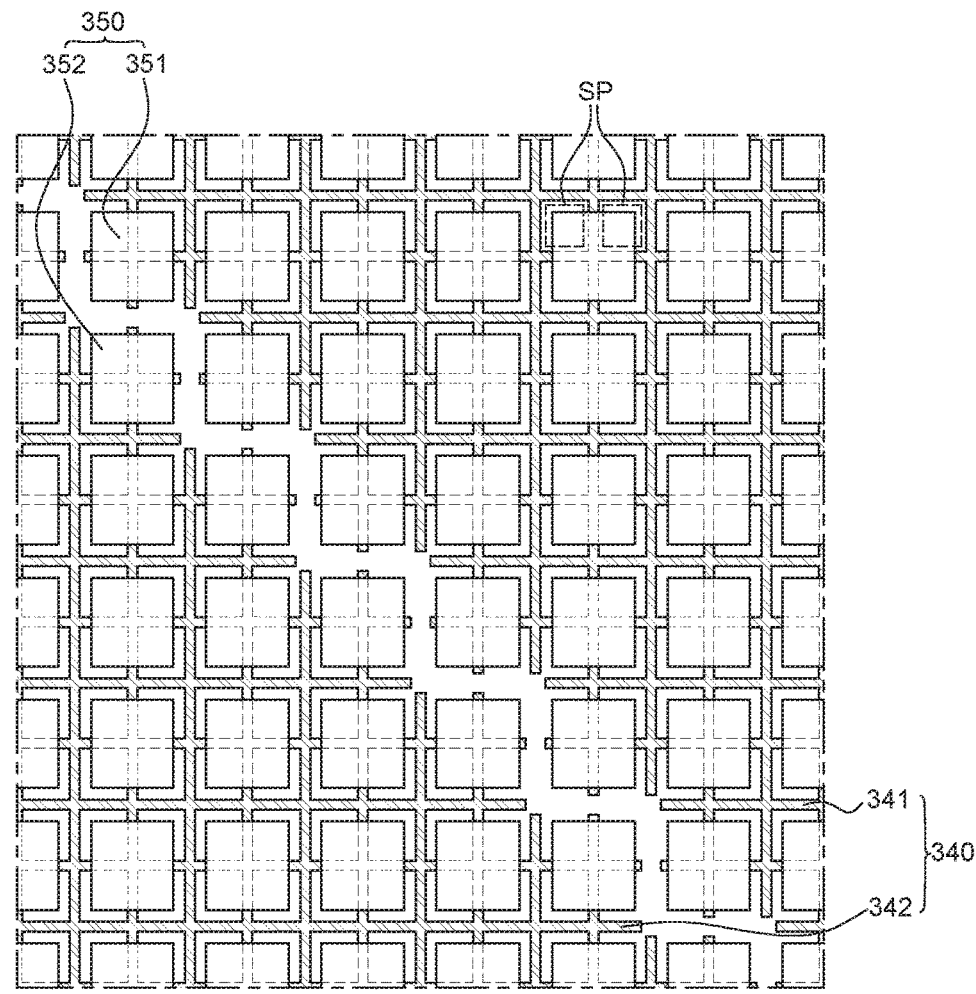
FIG. 5C is an enlarged plan view of region Y shown in FIG. 5A according to an exemplary embodiment of the present disclosure.

FIG. 5C is an enlarged plan view of region Y shown in FIG. 5A.

Referring to FIG. 5C, the first metal electrodes 341 and the second metal electrodes 342 in a mesh pattern are separated from one another. The touch electrodes 350 are divided into the first touch electrodes 351 and the second touch electrodes 352. Each of the touch electrodes 350 has a plurality of segments. Each of the plurality of segments has a size equal to an integer multiple greater than that of a sub-pixel (SP). In FIG. 5C, each of the plurality of segments has a size equal to four times a size of a sub-pixel (SP). However, the size of one touch electrode 350 is not limited thereto. For example, one touch electrode 350 may cover one or more sub-pixels (SPs) or may cover one pixel.

Figure 6:
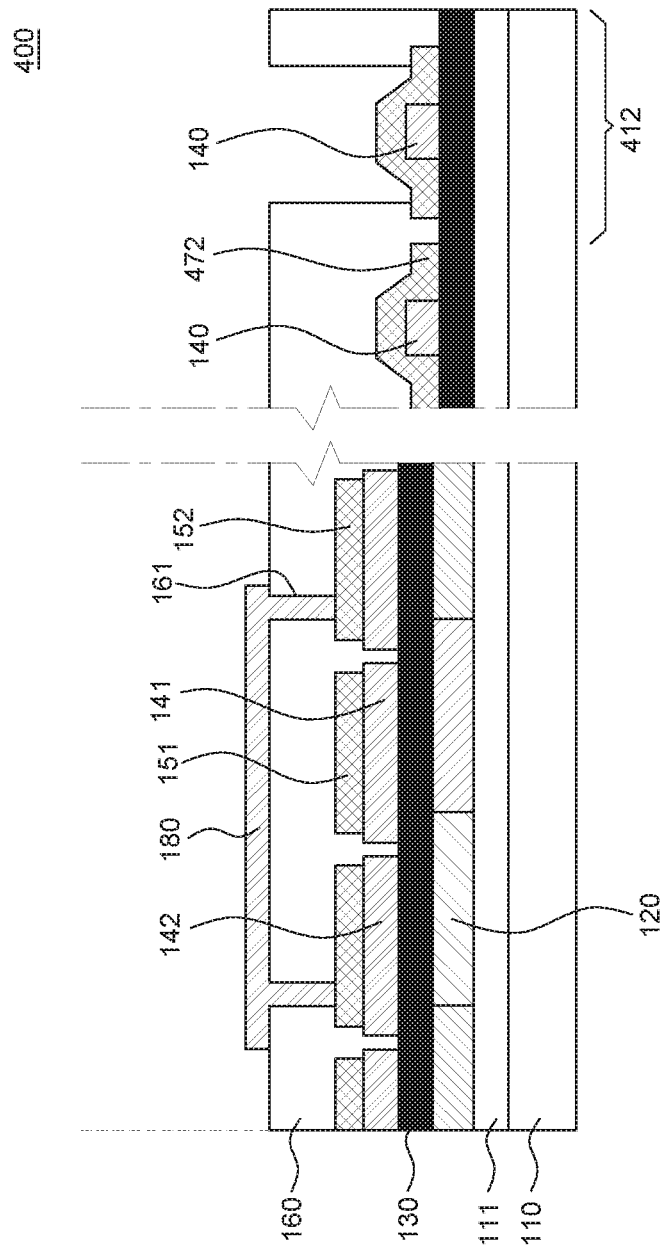
FIG. 6 is a schematic cross-sectional view of a touch-sensitive display device according to yet another exemplary embodiment of the present disclosure.

FIG. 6 is a schematic cross-sectional view of a touch-sensitive display device according to yet another exemplary embodiment of the present disclosure. The touch-sensitive display device 400 shown in FIG. 6 is identical to the touch-sensitive display device 100 shown in FIG. 2B except that the touch-sensitive display device 400 shown in FIG. 6 further includes an anti-oxidation layer 472 and a pad unit 412; and, therefore, redundant descriptions will not be made.

By employing a substrate 110 made of a flexible material such as plastic, the touch-sensitive display device 100 can be implemented as a flexible display device.

Although not shown in FIG. 6, in order to enhance adhesion of the metal electrodes 140 and the touch electrodes 150 in a flexible environment, an adhesion-enhancing layer (not shown) made of, for example, silicon oxide ($SiO_2$), may be formed between the metal and touch electrodes 140 and 150 and the substrate 110 or between the metal and touch electrodes 140 and 150 and the color filter 120.

The connection electrodes 180 are connected to the second touch electrodes 152 or to the second metal electrodes 142 through the contact holes 161 in the insulation film 160, thereby electrically connecting the second metal electrodes 142 to one another at intersections with the first metal electrodes 141. In FIG. 6, the connection electrodes 180 are connected to the second touch electrodes 152.

The metal electrodes 140 are extended to the pad unit 412 to transmit a touch sensing signal to a circuit unit. The extended metal electrodes 140 are exposed to the outside, and they may be covered by the anti-oxidation layer 427 to minimize oxidation of the exposed portion of the metal electrodes 140. The anti-oxidation layer 472 is made of the same material as the touch electrodes 150.

The insulation film 160 may be an organic insulation film such as PAC. In this regard, oxygen and moisture may be created due to residual gas used in a patterning process such as forming the contact holes 161 in the insulation film 160. Further, moisture may be created in an organic material of the insulation film 160 over time. Therefore, the metal electrodes 140 not covered by the touch electrodes 150 may be more vulnerable to moisture and oxygen contained in residual gas possibly produced in a process of forming the insulation film 160 and to the moisture coming from an organic material over time. Accordingly, an additional anti-oxidation layer (not shown) for preventing oxidation of the metal electrodes 140 may be formed on the metal electrodes 140 and the touch electrodes 150. The additional anti-oxidation layer may be made of one selected from a group consisting of silicon nitride ($SiN_x$), aluminum oxide ($Al_2O_3$) and silicon oxide ($SiO_2$). If the additional anti-oxidation layer is formed, contact holes may be formed in the additional anti-oxidation layer in order to connect the connection electrodes 180 to the second metal electrodes 142 or to the second touch electrodes 152. In doing so, the contact holes formed in the additional anti-oxidation layer conform to the contact holes 161 formed in the insulation film 160.

According to the present disclosure, each of touch electrodes is divided into a plurality of segments so that stress exerted when the touch electrodes are bent can be distributed over the segments.

In addition, according to the present disclosure, by employing metal electrodes, high touch sensitivity can be achieved with low voltage and power consumption can be saved accordingly.

It should be noted that effects of the present invention are not limited to those described above and other effects of the present invention will be apparent to those skilled in the art from the following descriptions.

Thus far, exemplary embodiments of the present disclosure have been described in detail with reference to the accompanying drawings. However, the present disclosure is not limited to the exemplary embodiments, and modifications and variations can be made thereto without departing from the technical idea of the present invention. Accordingly, the exemplary embodiments described herein are merely illustrative and are not intended to limit the scope of the present invention. The technical idea of the present invention is not limited by the exemplary embodiments. Therefore, it should be understood that the above-described embodiments are not limiting but illustrative in all aspects. The scope of protection sought by the present invention is defined by the appended claims and all equivalents thereof are construed to be within the true scope of the present invention.

What is claimed is:

1. A touch-sensitive display device comprising:
   a flexible substrate; a barrier layer formed on the flexible substrate;
   a color filter layer formed on the barrier layer;
   a black matrix formed on the color filter layer in a mesh pattern;
   a plurality of metal electrodes formed as the mesh pattern on the black matrix,
   the plurality of metal electrodes including a plurality of vertical electrode lines and a plurality of horizontal electrodes lines,
   each of the plurality of horizontal electrode lines intersecting at least one of the plurality of vertical electrode lines; and
   a plurality of transparent touch electrodes,
   each of the plurality of transparent touch electrodes formed having its center on the intersection of one of the plurality of vertical electrode lines and one of the plurality of horizontal electrode lines.

2. The touch-sensitive display device of claim 1, wherein the plurality of metal electrodes formed in the mesh pattern includes: a first set of metal electrodes in a first mesh pattern; a second set of metal electrodes in a second mesh pattern, the second set of metal electrodes at a first side of the first set of metal electrodes; and a third set of metal electrodes in a third mesh pattern, the third set of metal electrodes at a second side of the first set of metal electrodes that is opposite the first side; and wherein the second set of metal electrodes is electrically connected to the third set of metal electrodes without being directly connected to the third set of metal electrodes.

3. The touch-sensitive display device of claim 2, further comprising:
   an insulation film over the first set of metal electrodes, the second set of metal electrodes, and the third set of metal electrodes, the insulation film including a plurality of holes; and
   a connection electrode on the insulation film, the connection electrode electrically connecting the second set of metal electrodes to the third set of metal electrodes through the plurality of holes.

4. The touch-sensitive display device according to claim 2, wherein the first mesh pattern, the second mesh pattern, and the third mesh pattern have a same arrangement of metal electrodes.

5. The touch-sensitive display device according to claim 1, wherein the barrier layer is comprised of an organic layer or an inorganic layer.

6. The touch-sensitive display device according to claim 5, wherein the black matrix formed in the mesh pattern defines a plurality of pixels on the substrate.

7. The touch-sensitive display device according to claim 1, wherein a size of at least one of the plurality of transparent touch electrodes is an integer multiple greater in size than a size of pixel of the touch-sensitive display device.

8. The touch-sensitive display device according to claim 6, wherein the connection electrode is aligned with a horizontal portion of the black matrix.

9. A touch-sensitive display device comprising:
a flexible substrate; a barrier layer formed on the flexible substrate;
a color filter layer formed on the barrier layer;
a black matrix formed on the color filter layer in a mesh pattern; a first plurality of line electrodes and a second plurality of line electrodes being formed as the mesh pattern on the black matrix, a first touch sensing electrode and second touch sensing electrode formed on the first plurality of line electrodes and the second plurality of line electrodes;
the first touch sensing electrode formed having its center on an intersection of the first plurality of line electrodes,
the first touch sensing electrode including a first plurality of touch segments that are connected to each other via the first plurality of line electrodes; and
the second touch sensing electrode formed having its center on an intersection of the second plurality of line electrodes,
the second touch sensing electrode including a second plurality of touch segments that are connected to each other via the second plurality of line electrodes; and
wherein a capacitance between the first touch sensing electrode and the second touch sensing electrode changes in response to a touch of the device.

10. The touch-sensitive display device of claim 9, wherein the first plurality of touch segments and the second plurality of touch segments are made of a transparent conductive material.

11. The touch sensitive display device of claim 9, wherein a size of at least one of the first plurality of touch segments and the second plurality of touch segments is an integer multiple greater in size than a size of a pixel of the touch-sensitive display device.

12. The touch sensitive display device of claim 9, wherein the first plurality of line electrodes and the second plurality of line electrodes are made of a metal that has a lower resistance than the first plurality of touch segments and the second plurality of touch segments.

13. The touch sensitive display device of claim 9, further comprises a plurality of pixels, and wherein each of the first plurality of line electrodes and each of the second plurality of line electrodes is disposed between a pair of pixels from the plurality of pixels.

14. The touch sensitive display device of claim 9, wherein each of the first plurality of line electrodes and the second plurality of electrodes comprises a plurality of vertical electrodes and a plurality of horizontal electrodes, each of the plurality of horizontal electrode lines intersecting at least one of the plurality of vertical lines.

15. The touch sensitive display device of claim 9, wherein at least one segment from the first plurality of touch segments or the second plurality of touch segments respectively overlaps an intersection from the first plurality of line segments or the second plurality of line segments and a pixel.

16. The touch sensitive display device of claim 9, further comprising:
an insulation film over the first plurality of line electrodes and the second plurality of line electrodes.

* * * * *